July 17, 1928.

R. K. ORTT ET AL 1,677,682

DIFFERENTIAL MECHANISM

Filed Oct. 28, 1924     3 Sheets-Sheet 1

Inventors
R. K. Ortt
E. K. Ortt

By Herbert E. Peck   Attorney

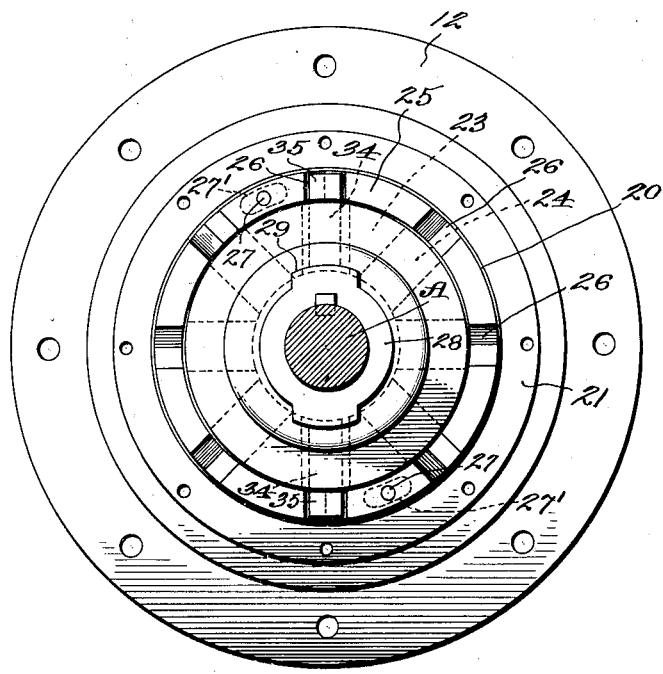
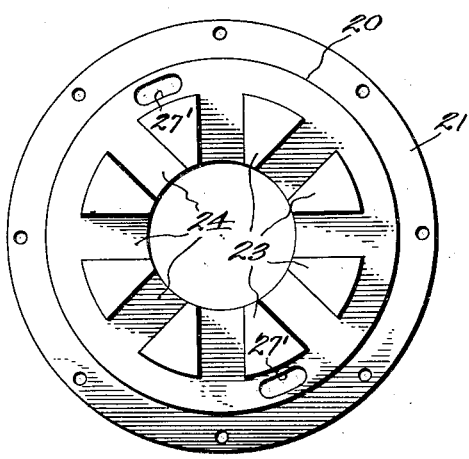
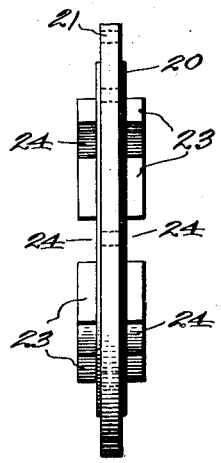

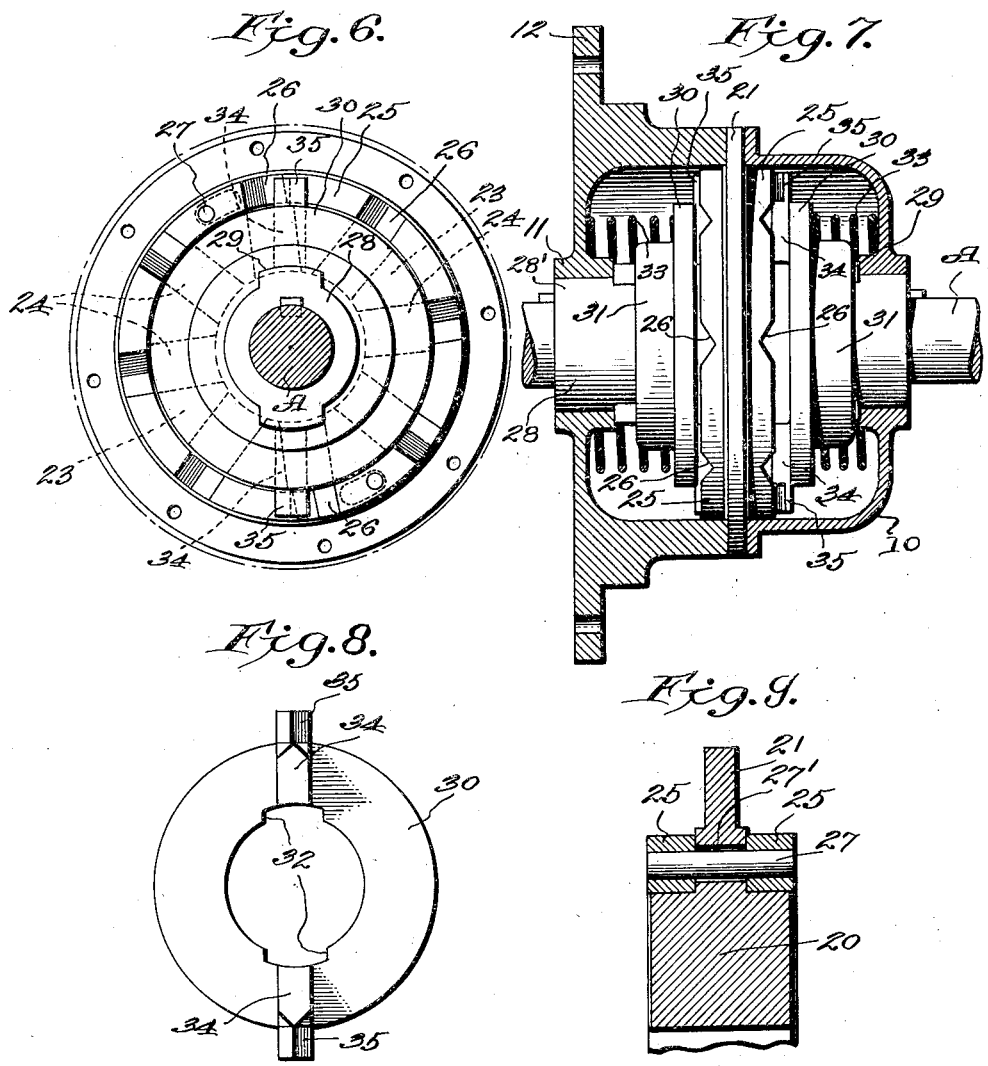

Patented July 17, 1928.

1,677,682

UNITED STATES PATENT OFFICE.

ROWLEY K. ORTT AND ELWOOD K. ORTT, OF DIXON, ILLINOIS, ASSIGNORS TO THE CLIPPER MANUFACTURING COMPANY, OF DIXON, ILLINOIS, A CORPORATION OF ILLINOIS.

DIFFERENTIAL MECHANISM.

Application filed October 28, 1924. Serial No. 746,309.

This invention relates to certain improvements in differential mechanism; and the nature and objects of the invention will be readily recognized and understood by those skilled in the art in the light of the following explanation and detailed description of the accompanying drawings illustrating what we at present consider to be the preferred embodiments or mechanical expressions of our invention from among various other forms, arrangements, combinations and constructions of which the invention is capable within the spirit and scope thereof.

In the "gear" type of differential, when one of the wheels driven thereby has a lesser tractive effect than the other wheel, then such wheel being positively driven will spin while the other wheel has the tendency to stand still and not rotate, due to the arrangement of the differential gearing, while in turning a corner with a vehicle equipped with this type of differential, the outside wheel turns faster than the inside wheel and the gearing of the differential acts upon the inside wheel in such a manner as to require counteraction of this effect by the operator in steering the vehicle. Further, in coasting or running without power, the gear differential will tend to cause lateral or side skidding of a vehicle if one of the wheels driven by the differential rotates faster than the other and there is a loss or decrease in traction by the slower rotating wheel, as the gears of the differential are so mounted and arranged that under such conditions they will permit the slower rotating wheel to rotate or tend to rotate in the reverse direction. These and certain other inherent disadvantages in the "gear" type of differential, well known to those familiar with this type, render the same inefficient in operation and use.

An object of the invention is to provide an improved differential of the so-called "gearless" type to overcome the disadvantages of the "gear" type of differential, and to avoid the complications, shocks and knocking, and other disadvantages presented by and incidental to the use of gearless differentials heretofore proposed, with the end in view of producing a gearless differential easy to assemble and take down, that will be smooth, quiet, reliable and accurate in operation, composed of a minimum number of parts so cooperating as to reduce lost motion and life-shortening wear to the minimum, and that by a simple, fool-proof and durable assembly will be automatic in action.

With the foregoing and other objects in view, the invention consists in certain novel features in combination, structure, and arrangement as more fully and particularly explained and specified hereinafter.

Referring to the accompanying drawings, in which similar reference characters refer to corresponding parts throughout:

Fig. 3, is a side elevation of the driving clutch member and the driven clutch plate in positive normal operative engagement therewith on one side thereof, and showing a vehicle driving axle and coupling sleeve in assembled position connected with the clutch plate.

Fig. 4, is a side elevation of the driving clutch member showing the formation and arrangement of clutch teeth thereon.

Fig. 5 is an edge elevation of the driving clutch member of Fig. 4.

Fig. 6, is a side elevation of the clutch member and clutch plate at one side thereof in released disengaged position and relation therewith for rotation independently thereof.

Fig. 7, is a top plan view of the differential mechanism with the casing in section and showing the clutch plate at one side of the clutch member disengaged for rotation of the driving axle independently of the clutch member, and with the clutch plate at the opposite side in positive driven engagement with the clutch member.

Fig. 8, is a plan view of one of the driven clutch plates showing the construction and arrangement of the clutch teeth and cam ring engaging lugs thereon.

Fig. 9, is a detail fragmentary view in section showing the mounting of the cam rings on opposite sides of the clutch member.

One possible form and adaptation of the invention is disclosed in the accompanying drawings and described herewith as applied to a vehicle of the automotive type to secure the desired differential action between the driving axles of such a vehicle in use. However, the illustrated embodiment and application is disclosed purely by way of example and not of limitation to present the principles and features of the invention, and the application to an automotive vehicle is selected as such example because the problems solved and the disadvantages overcome are present in a high degree, and hence permit of clearly explaining the various features of the invention. It will be clear that the principles and features of the invention are equally adapted to use and application to other forms and types of machine wherever a differential action between members or elements thereof may be desired, and that the invention is not restricted to the illustrated application and use.

Figure 1:
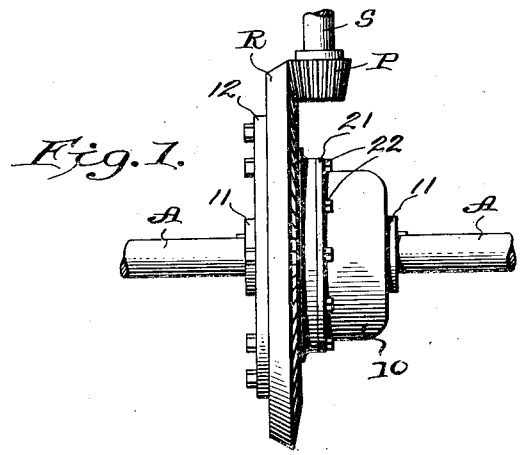
Fig. 1, is a plan view of differential mechanism embodying the invention as applied to a motor vehicle, showing the vehicle propeller shafts and vehicle driving axles in operative relation therewith.
Figure 2:
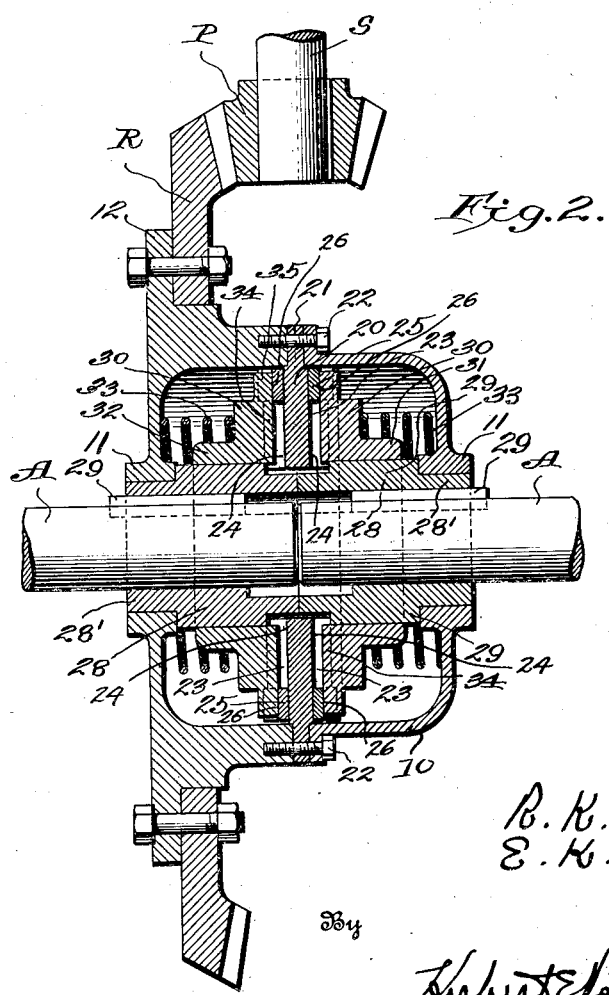
Fig. 2, is a transverse section through the differential mechanism as applied to a motor vehicle.

In the illustrated example of the invention as mechanically expressed for application to a vehicle, the differential mechanism includes a casing or housing 10 formed in two sections bolted or otherwise secured together and enclosing and containing the differential mechanism. Referring now to Figs. 1 and 2 of the drawings in particular, the differential casing 10 is formed with the alined, axial bearings 11 at opposite sides thereof through which the inner ends of the vehicle driving axles A extend, respectively. One of the sections of casing 10 is provided with a flange 12 therearound to which the usual or any desired ring gear R, or the like is bolted or otherwise suitably secured in operative mesh or engagement with the pinion P on the vehicle propeller shaft S. The foregoing mounting and arrangement of casing 10 carrying ring gear R in engagement with propeller shaft pinion P for rotation of the casing and the driving axles A, through differential mechanism within and coupling the casing with the ends of the axles A, is more or less conventional and will be readily recognized and understood by those skilled in this art.

According to the present embodiment thereof, the differential mechanism of the invention provides a driving clutch member in the form of a circular plate or annular disk having a peripheral flange portion 21 secured between the opposite sections of the casing 10 by bolts or the like 22, so that the clutch member 20 is mounted in and fixed to the casing 10 extending transversely thereacross dividing the sections thereof and rotatable therewith. The clutch member 20 is formed with a central bore or opening therethrough in axial alinement with the casing bearings 11 and the axles A, which latter extend through opposite sides thereof to a position at approximately the center of the member 20, the central opening therethrough being greater in diameter than the diameter of axles A, as clearly shown by Fig. 2 of the drawings. Similar annular series of clutch teeth 23, referring now to Figs. 4 and 5 of the drawings in particular, are formed on opposite sides of the clutch member 20, with the similar teeth of each series spaced around and extending radially from the central bore or opening through the member, each tooth 23, being substantially triangular shape in plan or outline, increasing in width outwardly so as to provide the spaces 24 between the teeth with substantially parallel opposite side walls. The clutch teeth 23 extend radially outwardly on opposite sides of member 20 and terminate a distance inwardly from the peripheral flange 21 in such a manner that the outer ends of the teeth of the two series end in circles of the same radius concentric with the axis of rotation of disk 20, and thus form annular bearing surfaces at opposite sides of the disk 20, for the cylindrical inner surfaces of two similar annular cam members or broken rings 25, with said annular cam members or broken rings 25, with said annular bearing surfaces surrounding the two circular series of clutch teeth, respectively. A cam ring 25 is mounted over and extending around the series of clutch teeth 23 on each side of clutch member 20, respectively, and is formed with a series of V-shaped cam notches or grooves 26 on the outer face thereof and substantially alined with and opposite the spaces 24, respectively, between the teeth 23, to form substantial outward continuations thereof. The cam rings 25 are secured in position on opposite sides of the clutch member 20 around the series of clutch teeth 23, respectively, by pins or the like 27 extending transversely therethrough and through elongated slots 27' in the member 20, as shown by Fig. 9 of the drawings. Each of the rings 25 is of greater thickness or depth than the adjacent clutch teeth 23 so that the outer face thereof is elevated or extends beyond the upper faces of the teeth, and the V-notches 26 are of less depth than the spaces 24 between the teeth, as clearly disclosed in Fig. 2 of the drawings particularly. The rings so mounted are thus secured together for movement or oscillation independently of the driving clutch member 20, through a distance defined by the length of the slots 27' through which pins 27 extend, in either direction to move the cam grooves 26 to a position in slight or partial nonalinement with the spaces 24 between the clutch teeth 23, as will be clear by reference to Fig. 6 of the drawings in particular.

The inner ends of the vehicle driving axles A are provided with separate sleeves 28, suitably fixed thereto for rotation therewith, as by the keys 29. These sleeves 28 each are formed with a reduced outer end portion 28' which extends through and is journaled in the bearings 11 formed in the sections of the casing 10 (see Figs. 2 and 7). The inner ends of the sleeves 28 extend into the central opening or bore of the driving clutch member 20 to and terminate midway therewithin (see Fig. 2).

A driven clutch plate 30 having a hub portion 31 formed with an axial bore therethrough provided with opposite key ways or grooves 32 longitudinally thereof (see Fig. 8) is slidably mounted on and over each coupling sleeve 28, with the sleeve keys 29 fitting and received in the keyways 32 and hub 31 extending outwardly therefrom, so that the clutch plates are rotatable with and slidable longitudinally of the coupling sleeves 28 on which mounted, respectively. A coil spring 33 of the expansion type is mounted over and around each sleeve 28, between and bearing against the adjacent end wall of casing 10 and the outer side or face of the clutch plate 30 mounted on the respective sleeve 28. The springs 33 normally force and maintain the clutch plates 30 in position bearing against the opposite faces of the driving clutch member 20, as will be more fully explained hereinafter. The arrangement and construction of each of the driven clutch plates 30 is illustrated in Fig. 8 of the drawings, and in the present example embodies the provision of diametrically opposite, alined teeth or projections 34 extending across and outwardly from that face of the plate which bears against the adjacent face of the driving clutch member 20 in mounted position thereof. The teeth 34 are extended outwardly beyond the plate 30 to form the radially disposed, diametrically opposite and alined fingers or lugs 35 which are each formed with the face thereof adjacent the clutch member 20, V-shaped to fit into and substantially conform to the V-shaped cam notches in the rings 25.

In mounted, operative position, the driven clutch plates 30 slidably mounted on the coupling sleeves 28 at opposite sides of the driving clutch member 20, respectively, are forced inwardly toward each other by the coil expansion springs 33, and against the opposite side faces bearing the clutch teeth 23 and the cam rings 25, of the driving clutch member 20. The teeth 34 of each clutch plate 30 are so disposed and arranged with respect to the clutch teeth 23 on the adjacent side of the clutch member 20, that they fit and are received between the teeth 23 in opposite alined spaces 24 therebetween, respectively, while the V-faced lugs 35 of the clutch plate 30 fit into opposite alined V-shaped cam notches 26 on the adjacent cam ring 25, respectively. The foregoing position of the plates 30 in normal operative driving engagement with the clutch member 20 is clearly shown by Figs. 2 and 3 of the accompanying drawings. It will be here noted that the teeth 34 on the clutch plates 30 are of less width than the spaces 24 between the clutch teeth 23 in which received, on the opposite faces, respectively, of the driving clutch member 20. Thus, in normal driving relation the operation of the vehicle propeller shaft S, rotates the differential casing 10, through engaged pinion P and the ring gear R, which in turn rotates the driving axles A through clutch member 20 engaged by the opposite clutch plates 30 mounted on and coupled with the driving axles A, respectively, as will be clear by reference to Figs. 1 and 2, particularly of the drawings, and will be readily understood therefrom by those familiar with this art.

Now, the operation of the foregoing described differential mechanism in use applied to a power propelled vehicle, as in the example disclosed herewith, is as follows. With the clutch plates 30 in normal engagement with the driving clutch member 20 and maintained in such engagement by the springs 33, power is transmitted in the manner hereinbefore described to the driving axles A and usual traction wheels (not shown) driven thereby. The application of the power to the driving clutch member 20 will move the same with respect to the cam rings 25, in the direction of its rotation which will cause the clutch teeth 23 to assume a position such that the spaces 24 therebetween will be slightly or partially out of alinement with the cam grooves or notches 26 and the fingers or lugs 35 of the driven clutch members 30 will bear against the inclined faces of the cam grooves in the direction of rotation, while the teeth 34 of members 30 remain in positive driving connection and engagement with the teeth 23 on opposite sides, respectively, of the driving clutch member 20. This position of the cam rings 25 with respect to the clutch teeth 23 with the member 20 rotating toward the right, is indicated in Fig. 6 of the drawings. Referring particularly to Figs. 1, 6 and 7 of the drawings, assume that the vehicle is turned from straight normal driving to make a turn toward the left, then the right hand axle A will tend to rotate faster than the left hand axle A. The right hand axle section and its clutch slide 30, 31, will then creep forward and cause its cam lugs 35, in the cam notches 26 of cam ring 25 to ride or slide upwardly on the inclined faces thereof, aided by the slight or partial nonalinement of the notches 26 and spaces 24 between teeth 23, which will force the clutch plate to slide outwardly on sleeve 28, from the clutch member 20 against the tension of spring 33, and lift the clutch plate teeth 34 from between and in engagement with the teeth 23 of the member 20, to the position shown in Figs. 6 and 7. Disengagement of teeth 34 from teeth 23 of member 20, will then permit relative forward movement of the plate 30 and driving axle A coupled therewith at a faster rate of rotation than the other plate 20 and axle A which remains operatively coupled with and driven by the driving clutch member 20 with which engaged. Upon completion of the turning movement of the vehicle and removal thereby of the tendency of right hand axle A and plate 30 to rotate faster than left hand axle A, the spring 33 will exert its expansion force and force the clutch plate 30 inwardly on sleeve 28 into engagement with the teeth 23 of member 20, to normal operative driving relation and position, as shown in Figs. 2 and 3 of the accompanying drawings. It will be noted that in turning movements of a vehicle with the differential mechanism of the invention thereon, the faster turning driving axle is completely released and uncoupled from driving relation and is free to rotate independently of the slower rotating axle which remains in positive engagement and is driven from the clutch member 20. In this manner the disadvantages of positively driving both the driving axles and traction wheels thereof when rotating at different speeds is avoided. The operation of the differential mechanism when turning to the right with the left hand driving axle rotating at a faster rate than the right hand axle, is similar to and will be understood from the foregoing description.

When the vehicle is operated in the reverse direction or "backed", the driving clutch member 20, will then move or oscillate in the reverse direction (toward the left in Figs. 3 and 6) toward the end of the slots 27', and the spaces 24 between the clutch teeth 23 will be slightly or partially out of alignment with the cam grooves or notches 26 in the direction of rotation, so that upon the tendency of one shaft A to rotate faster than the other, the driven clutch plate 30 thereon will "ride" or slide upwardly out of engagement with the cam notches 26 and the teeth 23 on member 20, and rotate freely independently of such member and the clutch plate 30 and opposite axle A, as hereinbefore referred to and described.

Desiring to protect our invention in the broadest manner legally possible, what we claim is:

1. A differential comprising a rotary driven housing, alined shaft sections rotatably mounted in the ends of and extending axially into said housing, a driving disk carried and rotated by the housing and formed at both vertical side faces with similar annular series of spaced radial clutch teeth, two independent driven clutch sleeves at opposite sides of said disk and having clutch plates formed with clutch teeth normally operatively engaging and driven by said teeth of the disk, each shaft section provided with and normally driven by one of said sleeves rotating therewith and slidable longitudinally thereof; expansion springs to independently hold said sleeves in normal operative driven relation with said disk; two cam rings, one for each driven clutch sleeve, said rings arranged at the opposite vertical faces of said disk surrounding the annular series of teeth and bearing on the outer ends of the teeth and secured together and having limited rotary movement with respect to the disk and driven thereby; each ring at its outer vertical face having a continuous annular series of radial cam notches approximately radially alined with the spaces between the teeth of the annular series of clutch teeth; each clutch plate having radially projecting cam portions to ride on said cam rings and cooperate with the cam notches thereof to automatically slide one or the other clutch sleeve outwardly against the pressure of its spring to disengage said sleeve from the clutch teeth of the driving disk, when the shaft section of said sleeve rotates faster than the shaft section of the other sleeve.

2. Differential mechanism comprising a rotary driven disk for driving and concentric with a divided axle, the opposite vertical side faces of said disk having similar annular series of spaced projection clutch teeth rigid therewith, two circular cam rings seated against the opposite side faces of said disk, respectively, and concentric with said series of teeth and the disk axis of rotation and extending across corresponding ends of the spaces between the series of teeth and corresponding ends of the teeth, respectively, said two rings being fixedly secured together and being rotated by and with the disk and having a limited relative rotary movement as a unit with respect to the disk, each ring at its outer side face formed with a continuous annular series of pairs of diverging cam surfaces arranged at the ends of the annular series of spaces between the series of said clutch teeth, and two driven clutch sleeves rotatable with and longitudinally movable on the axle sections, respectively, said disk being arranged between said sleeves, said sleeves being constantly spring pressed toward operative engagement with said disk, said sleeves having driven clutch teeth rigid therewith for normal driven engagement with teeth of the adjacent sides of the disk and with rigid portions constantly bearing against the outer sides of said cam rings to normally rotate therewith, and whereby either clutch sleeve is free to advance more rapidly than the disk and other sleeve, with said rigid portions riding forward on the cooperating ring and forced outward by cam surfaces thereof to free the clutch teeth of the disk and said sleeve.

3. Differential mechanism comprising alined sections of a divided axle each provided with a spring pressed sleeve rotating therewith and slidable longitudinally thereof, the adjacent ends of the sleeves providing annular driven clutch plates, said plates at their operative faces having spaced clutch teeth rigid therewith and radially beyond said teeth provided with V-shaped portions rigid with said plates, in combination with a driven rotary axle driving disk arranged between said sleeves and their plates and at its opposite side faces having annular series of spaced clutch teeth complementary to said clutch teeth of said plates, respectively; two unbroken cylindrical cam rings surrounding said series of teeth of the disk, respectively, and seated against the opposite side faces of the disk, said rings at their outer faces having continuous annular series of V-notches extending radially of their outer faces in approximate radial outward continuation of the spaces between the disk clutch teeth, said V-shaped portions of the clutch plates held in constant contact with said outer faces of the rings to cooperate with the notches in releasing either clutch slide from the disk teeth and permit relatively rapid rotation of said slide.

Signed at Dixon, Illinois, this 9th day of October, 1924.

ROWLEY K. ORTT.
ELWOOD K. ORTT.